July 28, 1925.

D. L. KOHLMAN, JR 1,547,762

STEAMING OR COOKING PAN, KETTLE, ETC

Filed Dec. 4, 1923.

Inventor

Dirk Lodewijk Kohlman Jr.

By

Attorney

Patented July 28, 1925.

1,547,762

UNITED STATES PATENT OFFICE.

DIRK LODEWIJK KOHLMAN, JR., OF DORDRECHT, NETHERLANDS.

STEAMING OR COOKING PAN, KETTLE, ETC.

Application filed December 4, 1923. Serial No. 678,463.

*To all whom it may concern:*

Be it known that I, DIRK LODEWIJK KOHLMAN, Jr., of Dordrecht, residing at Dordrecht, the Netherlands, have invented certain new and useful Improvements in Steaming or Cooking Pans, Kettles, Etc., of which the following is a specification.

The present invention relates to a steaming or cooking pan, kettle or other vessel of the type having an inner and an outer pan communicating with each other through perforations in the inner pan.

The invention has for its object to provide an improved device of this kind, in particular with regard to bringing and keeping the contents of the inner pan at the desired uniform temperature.

The invention has further for its object to provide an improved construction of inner pan for use with combined pans of the above type.

A further object of the invention is to provide the outer pan with an improved bottom construction.

A still further object of the invention is to provide a cooking or steaming pan comprising an outer pan and a plurality of inner pans located one above the other.

In order that the invention may be clearly understood reference is directed to the accompanying drawings illustrating various embodiments by way of example.

Figure 1:
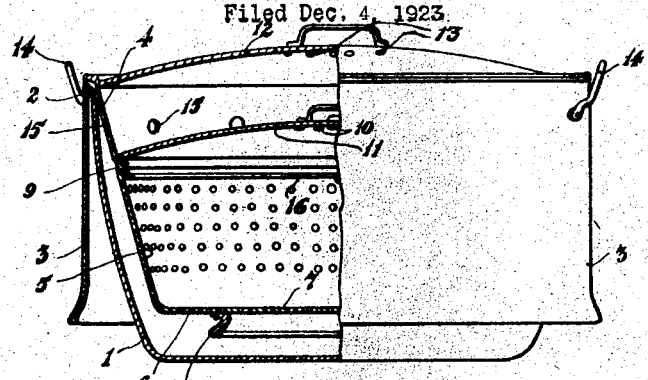
Fig. 1 is partly a section and partly an elevation of a combined outer and inner pan according to the invention.

Referring to Fig. 1 the outer pan 1 is connected by means of a beaded edge 2 to an outer mantle 3. From the said edge 2 the inner pan is suspended with its upper edge 4.

The inner pan is provided with a perforated side wall 5 merging into an unperforated circumferential annular bottom portion 6. The central portion of the bottom 7 is provided with perforations. Between the annular portion 6 and the central portion of the bottom a depending collar 8 is attached to the bottom the said collar diverging towards the bottom of the outer pan. The side wall of the inner pan is provided with an annular flange 9 serving as a support for the cover 11 provided with holes 10. The outer pan is closed by a cover 12 having holes 13 therein. Both covers possess handles and the outer pan is also provided with handles 14. The mantle space communicates through apertures 15 in the outer and inner pans with the space between the covers 11 and 12. It follows from the above that the inner pan has perforations in the bottom 7 inside an unperforated annular circumferential portion 6, perforations in the side wall under the cover 11 and perforations 15 in the portion of the side wall located above the cover 11.

Assuming that the inner pan is filled with potatoes and that the outer pan contains water the level of which is located somewhat below the bottom of the inner pan and that the whole is placed, e. g., on a gas burner, then the operation of the pan is as follows:

The steam generated after the pan has been heated for some time ascends and is guided partially by the collar 8 centrally into the inner pan through the perforations 8 in the central portion of the bottom 7. Another portion of the steam flows through the annular space between the outer and inner pans, then through the perforations in the side wall 5 under the cover 11 and finally escapes through the holes 10 in the inner cover 11 and the holes 13 in the outer cover 12. The steam within the space between the two pans will also flow through the perforations 15 in the portion of the wall of the inner pan located above the cover 11. In this manner the water will be quickly evaporated, during which the steam will so act upon the potatoes that they are sufficiently done for emptying the pan whereby straining off is superfluous.

Meanwhile the hot air obtained by the gas flame has ascended in the mantle space between the mantle 3 and the outer pan and flows through the perforations 15 into the space between the two covers. An excess of hot air can escape through the holes 13 in the outer cover. In this way condensation of steam between inner and outer pan is prevented while the heat generated is most advantageously and completely utilized.

It is remarked that the conical collar 8 may also be of another shape. Sometimes a bead of semicircular cross section will suit the purpose offering at the same time a proper support for the inner pan after it has been taken out.

If it is desired that the steam enters into the inner pan only through the bottom and the side wall portion 5 located under the cover 11, then an annular partition may be provided below the perforations 15 so that no steam can escape through these perforations into the space between the two covers but is caused to reach this space through the inner pan.

In order to prevent the central core of the contents of the inner pan from becoming too hot the central portion of the bottom of the inner pan may be unperforated so that the bottom of the inner pan only has perforations between an unperforated central portion and an unperforated circumferential portion.

Figure 2:
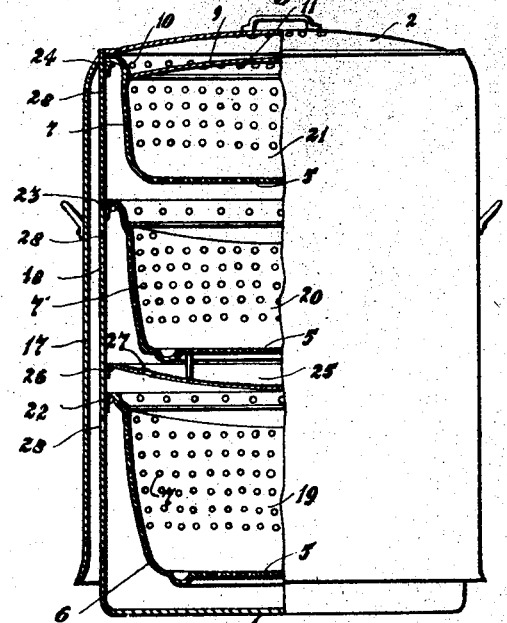
Fig. 2 shows partly in section and partly in elevation an outer pan containing three inner pans located one above the other.

In Fig. 2 a pan is shown having a single outer pan 18 provided with a mantle 17. In this outer pan are mounted three inner pans 19, 20 and 21, mainly corresponding to the inner pan according to Fig. 1. The outer pan 18 is further provided with supporting annular flanges 22, 23 and 24 secured to its inner wall, from which flanges the inner pans are suspended with their upper edges, being suitably shaped to this end. Instead of supporting flanges for the upper edge of the inner pans a supporting plate 25 may be used resting on a supporting flange 26, on the said supporting plate an inner pan having feet may be placed. The supporting plate possesses one or more apertures 27 for the passage of steam. The perforated covers of the lower and the middle inner pan are reversed and are adapted to receive eventual condensation water. The mantle 17 extends from the upper edge of the outer pan 18 downwardly to almost the lower end of this pan so that a heating space surrounds the whole pan. The wall of the outer pan 18 is provided with openings 28 for heat transmission. Upon the outer pan a cover corresponding to the cover 2 of Figure 1 is placed. The operation of the pan will be clear from the drawing after that which has been stated in connection with the pan according to Fig. 1.

Figure 3:
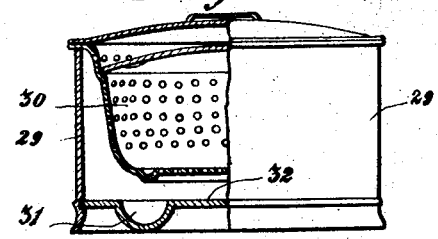
Fig. 3 shows a combined pan with improved bottom construction for the outer pan.

In Fig. 3 the outer pan 29 has no mantle, while the inner pan is indicated by 30. In this embodiment the bottom of the outer pan has a recessed portion in the form of an annular gutter 31 and this gutter surrounds a flat unperforated central bottom portion 32. It goes without saying that without departing from the principle of the invention the bottom may also be shaped otherwise, e. g., be provided with two or more concentric gutters or be corrugated. The bottom could also be provided with a large number of small concave portions. In general terms the bottom is characterized by portions located at lower and higher levels. The lower portions are used for receiving the water. When a bottom of this kind is heated then at the place of the portion or portions not in contact with the water the steam formed by the evaporation of the water will be superheated, which is advantageous for the steaming process. Moreover the bottom portion or portions receiving the water may be of such predetermined volume that it constitute a measure for the quantity of water required in a certain case.

If desired the outer pan may have vertical passages into which the flames of the heat source can enter so that in this way the heat source is utilized most effectively. The said passages may be narrower at the top and grow wider gradually downwardly. The outer pan may, e. g., be rectangular in cross section and a passage may then be provided at each corner.

Having now particulary described and ascertained the nature of my said invention what I claim as new and desire to secure by Letters Patent is:

1. Steaming or cooking pan comprising an inner and an outer pan communicating with each other by perforations in the inner pan, a mantle surrounding the outer pan and perforations in the wall of the outer pan and of the inner pan, a cover with perforations for the outer pan, a cover for the inner pan supported upon supporting means located below the upper edge of the inner pan, perforations in the wall portion of the inner pan below the said cover and perforations in the wall portion of the inner pan above the said cover.

2. A steaming or cooking vessel comprising an outer pan; an inner pan supported in said outer pan, said inner pan having perforations therein to form communicating passages between said pans; and a cover for said inner pan adapted to seat below the upper edge of said inner pan to thus form a perforated wall portion above the cover.

3. A steaming or cooking vessel comprising an outer pan; a perforated inner pan supported on the upper edge of said outer pan; and a cover for said inner pan adapted to seat below the upper edge of said inner pan to thus form a perforated wall portion above the cover.

4. A steaming or cooking vessel comprising an outer pan; a perforated inner pan supported in said outer pan, said inner pan having an annular flange below the upper edge thereof; and a cover adapted to seat on said annular flange thus forming a perforated wall portion above the cover.

5. A steaming or cooking vessel comprising an outer pan; a perforated inner pan supported in said outer pan, said inner pan having an annular flange below the upper edge thereof and a bottom portion comprising an imperforated annular portion surrounding a perforated central portion; and a cover adapted to seat on said annular flange thus forming a perforated wall portion above the cover.

6. A steaming or cooking vessel comprising an outer pan; a perforated inner pan supported on the upper edge of said outer pan, said inner pan having a bottom portion comprising an imperforated annular portion surrounding a perforated central portion; and a cover for said inner pan adapted to seat below the upper edge of said inner pan to thus form a perforated wall portion above the cover.

7. A steaming or cooking vessel comprising an outer pan; an inner pan supported in said outer pan, said inner pan having perforations therein; a cover for said inner pan adapted to seat below the upper edge of said inner pan to thus form a wall portion above the cover; and a mantle surrounding the side of the outer pan.

8. A steaming or cooking vessel comprising an outer pan; an inner pan supported in said outer pan, said inner pan having perforations therein to form communicating passages between said pans; a cover for said inner pan adapted to seat below the upper edge of said inner pan to thus form a perforated wall portion above the cover; and a mantle surrounding the side of the outer pan.

9. A steaming or cooking vessel comprising an outer pan; a perforated inner pan supported on the upper edge of said outer pan; a cover for said inner pan adapted to seat below the upper edge of said inner pan to thus form a perforated wall portion above the cover; and a mantle surrounding the side of the outer pan.

10. A steaming or cooking vessel comprising an outer pan having perforations in the side therein near the upper edge; a perforated inner pan supported on the upper edge of said outer pan; a cover for said inner pan adapted to seat below the upper edge of said inner pan to thus form a perforated wall portion above the cover; and a mantle surrounding the side of the outer pan and secured thereto at the upper edge.

11. A steaming or cooking vessel comprising an outer pan; a perforated inner pan supported on the upper edge of said outer pan; a cover for said inner pan adapted to seat below the upper edge of said inner pan to thus form a perforated wall portion above the cover; a mantle surrounding the side of the outer pan; and a second cover for the vessel adapted to seat on the upper edges of said pans.

12. A steaming or cooking vessel comprising a perforated pan having an annular flange in the side thereof below the upper edge; a cover adapted to seat on said flange of the pan for forming a perforated wall portion above the cover; and a second cover adapted to seat on the upper edge of the side of said pan.

13. A steaming or cooking vessel comprising an outer pan; a perforated inner pan supported on the upper edge of said outer pan, said inner pan having a bottom portion comprising an imperforated annular portion surrounding a perforated central portion; a cover for said inner pan adapted to seat below the upper edge of said inner pan to thus form a perforated wall portion above the cover; and means on the bottom portion of the inner pan for directing the vapors to the perforated central portion of said bottom portion.

14. A steaming or cooking vessel comprising an outer pan; a perforated inner pan supported on the upper edge of said outer pan, said inner pan having a bottom portion comprising an imperforated annular portion surrounding a perforated central portion; a cover for said inner pan adapted to seat below the upper edge of said inner pan to thus form a perforated wall portion above the cover; and a collar secured to the bottom portion of the inner pan for directing the vapors to the perforated central portion of said bottom portion.

15. An inner pan for a steaming or cooking vessel comprising a perforated pan having an annular flange in the side thereof below the upper edge; and a cover adapted to seat on said flange of the perforated pan for forming a perforated wall portion above the cover.

16. An inner pan for a steaming or cooking vessel comprising a perforated pan having a supporting means at the side thereof below the upper edge; and a cover adapted to seat on said supporting means of the perforated pan for forming a perforated wall portion above the cover.

In testimony whereof I affix my signature.

DIRK LODEWIJK KOHLMAN, Jr.